Figure 1:
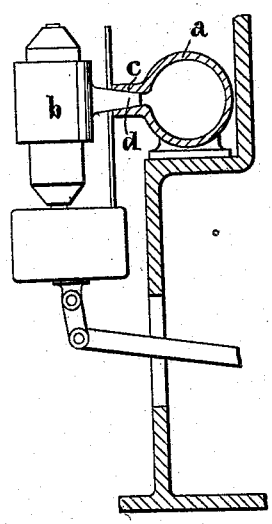

S. Z. DE FERRANTI.
MOTOR DRIVEN TWISTING ELEMENT FOR SPINNING, DOUBLING, AND TWISTING MACHINES.
APPLICATION FILED AUG. 13, 1906.

930,850.

Patented Aug. 10, 1909.
4 SHEETS—SHEET 1.

ATTEST.
Bent M. Stahl.
Edward N. Saxton.

INVENTOR.
Sebastian Z. de Ferranti.
BY Spear, Middleton, Donaldson & Spear
ATTYS S. Z. DE FERRANTI.
MOTOR DRIVEN TWISTING ELEMENT FOR SPINNING, DOUBLING, AND TWISTING MACHINES.
APPLICATION FILED AUG. 13, 1906.

930,850.

Patented Aug. 10, 1909.
4 SHEETS—SHEET 2.

Fig. 6.ᵃ

Attest:
A. M. Tanner
E. N. Barton

Inventor
Sebastian Z. de Ferranti.
by Spear, Middleton, Donaldson & Spear
Att'ys.

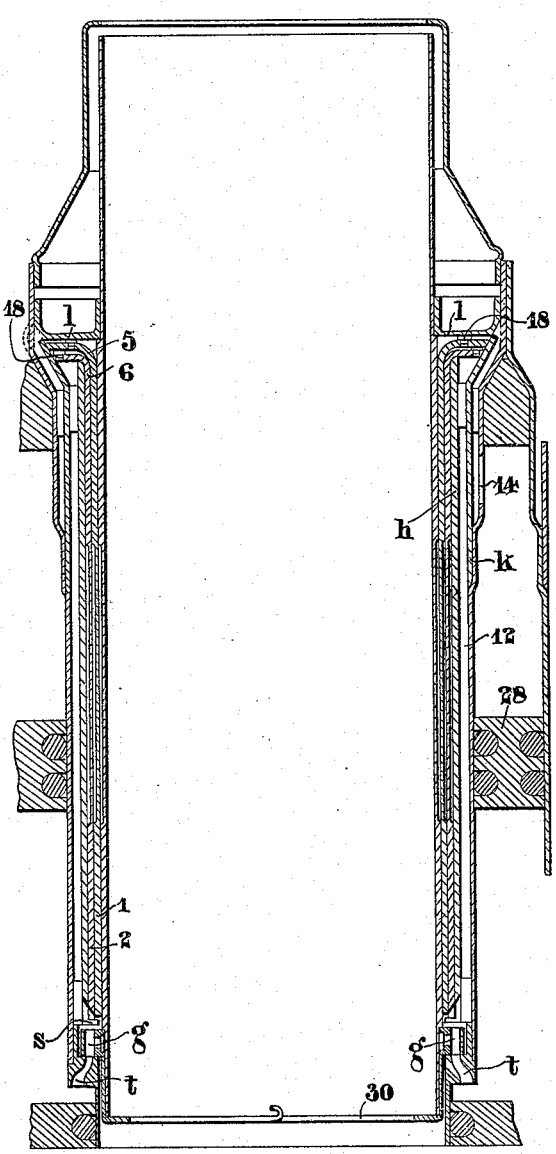

UNITED STATES PATENT OFFICE.

SEBASTIAN ZIANI DE FERRANTI, OF LONDON, ENGLAND.

MOTOR-DRIVEN TWISTING ELEMENT FOR SPINNING, DOUBLING, AND TWISTING MACHINES.

No. 930,850.

Specification of Letters Patent.

Patented Aug. 10, 1909.

Application filed August 13, 1906. Serial No. 330,472.

*To all whom it may concern:*

Be it known that I, SEBASTIAN ZIANI DE FERRANTI, a subject of the King of Great Britain and Ireland, and residing at 31 Lyndhurst road, Hampstead, in the county of London, England, have invented certain new and useful Improvements Relating to Motor-Driven Twisting Elements for Spinning, Doubling, and Twisting Machines, of which the following is a specification.

This invention relates to improvements in motor-driven twisting elements for spinning, twisting and doubling machines.

In the specifications of my patent applications, Serial Nos. 221295, 260120 and 272560, I have described certain improvements in textile processes and in constructions of apparatus having for their main object the obtaining of much higher rates of production than are now common in textile work.

Now the present invention has for its object to provide improved forms of motor driven twisting elements for obtaining such high rates of production.

In a spinning, twisting or doubling machine it is often desirable to reverse the direction of rotation of the twisting element so that either a right or left hand twist may be imparted to the material. One method of effecting this in a turbine driven element would be to arrange the turbine with separate sets of blades and nozzles for either direction of rotation, but unless special precautions are taken in the construction of the turbine owing to the losses due to the fanning action of the blades and skin frictional resistances, the efficiency of the turbine would become so low as to make it almost practically prohibitive. A method of reducing the above losses is dealt with in a concurrent application for Letters Patent No. 330,471 and is not herein claimed, and consists in inclosing the blades in a smooth and closely fitting casing and causing the discharge from the various nozzles of a group to combine in one or more streams. In working with ring fliers, I overcome these objections according to my invention by fitting the tubular ring flier with a turbine centrally disposed in relation to the length of the flier and having air bearings on each side of the turbine, the whole being rotatable about an axis at right angles to the axis of rotation of the ring flier. Reversing is effected by rotating the whole element about this axis through an angle of 180°. It will be evident that in such an arrangement the same set of blades and nozzles are employed for rotation of the turbine for either direction of twisting. An alternate method to the above consists in removing the ring flier from the casing, and inverting the turbine blade ring situated thereon, after which the ring flier is reinserted in its casing. In this case, however, separate sets of nozzles are required for each direction of rotation, one set being rendered inoperative by a suitable blanking piece or valve according to the disposition of the ring flier.

Figure 2:
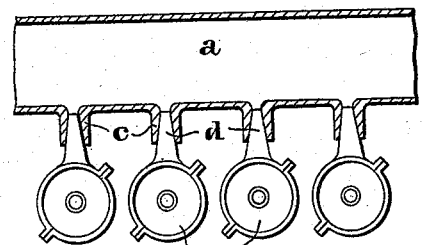
Figure 3:
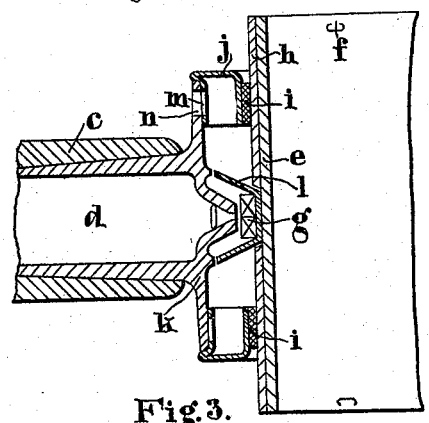
Figure 4:
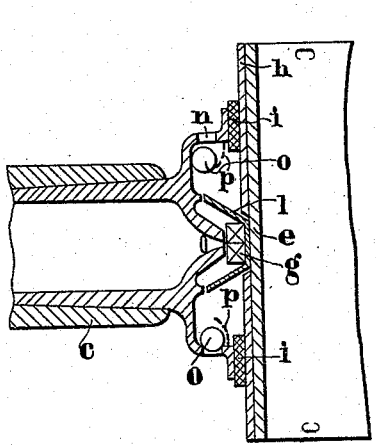
Figure 5:
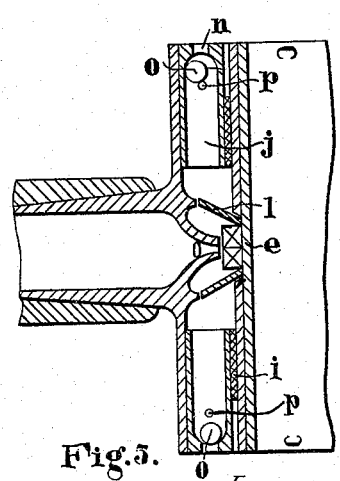
Figure 8:
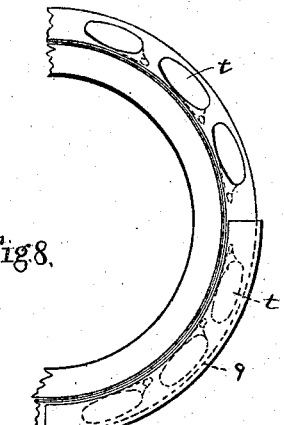
Figure 6:
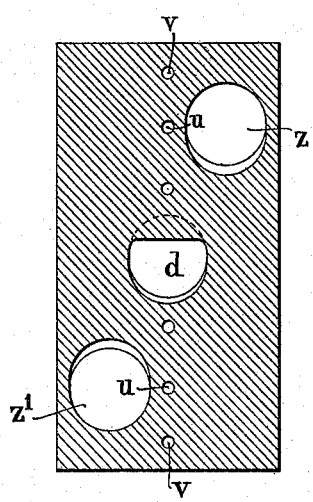
Figure 6:
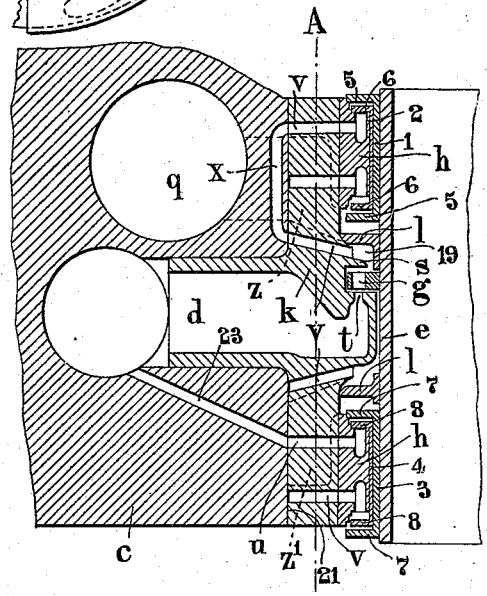
Figure 7:
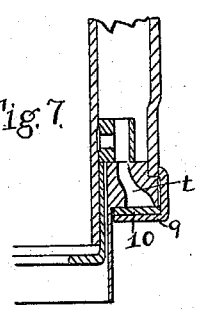
Figure 9:
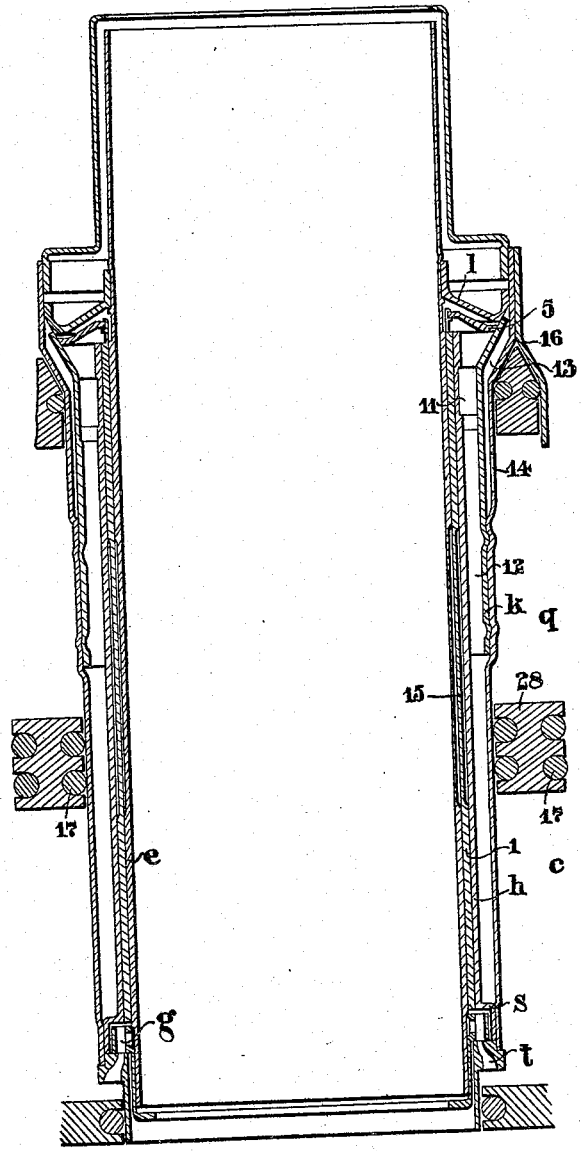
Figure 10:
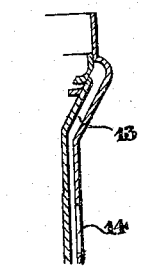
Figure 11:
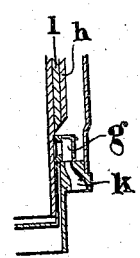

Referring now to the accompanying drawings which illustrate my invention and form part of my specification, and which are of a somewhat diagrammatic nature, Figure 1 is a part sectional elevation, and Fig. 2 is a part sectional plan of a twisting machine fitted with ring fliers constructed according to my invention. Fig. 3 is a detail view of the ring fliers shown in Figs. 1 and 2. Figs. 4 and 5 are detail views illustrating modifications of the type of ring flier shown in Fig. 3. Fig. 6 shows a modification of the form of ring flier shown in Fig. 3 and which is adapted to discharge the working fluid into an exhaust chamber. Fig. 6ª shows a vertical section through the line A. A of the view shown in Fig. 6 showing the exhaust passages. Fig. 7 is a detail of a nozzle arrangement provided with a blanking valve. Fig. 8 is an inverted plan of the view shown in Fig. 7. Fig. 9 is a sectional elevation of a ring flier having the turbine disposed at its lower extremity. Fig. 10 is a detail view of part of the ring flier shown in Fig. 9. Fig. 11 is a detail view of the ring flier illustrated in Fig. 9 showing the shielding ring cut away opposite the nozzles. Fig. 12 shows a modification of the ring flier ilustrated in Fig. 9. Fig. 13 is an outside elevation of the ring flier shown in Fig. 12.

In the drawings where desirable similar parts are denoted by the same reference symbols.

For purposes of reversing I may use turbines shielded so as to prevent the blade setting air in motion and thereby absorbing power, and provide right and left hand wheels on each rotating element and supply each wheel from suitable nozzles but in order to save power in running and complication in construction I prefer to construct the ring fliers turbine driven in such a manner according to my present invention that reversing may be obtained with (a) a single set of nozzles and blades arranged to run in one direction only. This result I acomplish by providing means whereby the bearing and ring flier complete may be turned through an angle of 180° on an axis at right angles to its axis of rotation. In other words the ring flier casing is mounted upon a socket through which the supply of elastic fluid is brought and which enables the casing to be turned upside down. This arrangement provides for reversal of the direction of rotation of the twisting part in relation to the machine, the rotation of the turbine blades however being always in the same direction in relation to the nozzles. In constructing a machine according to this plan I may for example eliminate the ring flier rail which ordinarily carries the air bearings and replace it by a pipe, a, Figs. 1 and 2, disposed on each side of the machine and behind the air bearing elements, b, the pipe, a, being of sufficient strength not only to contain the working fluid but also to act as a girder for supporting the air bearing elements. The pipe, a, is constructed with a number of tubular openings, c, one of which is provided for each air bearing element. Into the tubular openings c, which are by preference slightly conical, spigots, d, are inserted which serve to support the air bearing elements and convey the air to the turbines of the ring fliers disposed in said elements. As it is desirable to economize space the air bearing elements should be placed as near one another as possible but this arrangement may necessitate the removal of all the elements in order to invert them for purposes of reversing though in most cases the removal of half of them will be sufficient. It will also be necessary when reversing that the spindle rail or its equivalent element should be lowered farther than in ordinary circumstances so that the spindles may be quite clear of the air bearing elements. This lowering of the spindle rail may be effected by means of a crank or cam gear which lowers the centers upon which the lifting gear works.

According to a modification of the above method instead of having an air pipe down each side of the machine as above described, I may use a single air pipe of larger dimensions with air bearing elements on each side of it. Then reversing may be effected by rotating the pipe through an angle of 180° so that each set of air bearings is transferred to the side of the machine opposite from that on which they were originally disposed, thus effecting the reversal of the direction of rotation in relation to the machine. For this purpose it is necessary to clear not only the spindles but also the other mechanism of the machine. I construct the air bearing elements for use acording to this method of reversing with a central rotating part, e, Fig. 3, which constitutes the ring flier and is provided with winding hooks, f, at each extremity and with turbine blades, g, of any suitable type, disposed preferably in the middle of its length. The stationary bearing parts, h, for the part, e, are situated above and below the turbine blades and are supported by means of flexible packing rings, i, disposed between the cover, j, and the part, h. The casing, k, for the flier is made in two parts for convenience of construction, and is held together by screws as in Fig. 2, one of the parts being formed integrally with the conical spigot, d, which supplies the air to the turbine and supports the air bearing element. The rotating part, e, may in this case be held up by means of the magnetic support already described in my patent application No. 260120, but I prefer to support it by means of the air pressure from the exhaust acting on flanges, l, although it is necessary that the pressure of the supporting medium should always act upward notwithstanding the fact that the bearing is inverted when it is desired to reverse the direction of rotation. This I accomplish by forming a chamber above and below the air supporting flanges, l, of the part, e. According to one method I construct the covers, j, of this chamber, Fig. 3, with holes, m, situated thereon which are adapted to register with holes, n, in the casing, k, so that by rotating the covers, j, which are preferably milled on their outside edges, the holes, m and n, may be made to register or not as desired. When the upper holes are in register and the lower ones are in the closed position the air after operating on the blades, g, is exhausted through the upper holes the pressure on the top of the upper supporting flange, l being thereby relieved. The lower flange is in equilibrium and the combination results in an air balanced ring flier working in a manner already described in my patent applications 260120 and 272560.

According to another method I may effect the support of the ring flier in an automatic manner for either position of the bearing which is illustrated in Figs. 4 and 5. In these figures a number of holes, n, are formed either in the casing, k, as in Fig. 4, or in the covers, j, as in Fig. 5, which are adapted to be closed by balls, o, such as those used in ball bearings, a guard wire, or shield, p, being provided in order to prevent the balls falling into the exhaust chamber. In the chamber which happens to be uppermost the balls, p, fall away from the openings, n, thus leaving a free passage for the air from the chamber above the upper supporting flange, $l$, while in the lower chamber the balls fall by their own weight covering the holes and preventing the air issuing therefrom. There is thus a difference of pressure between the two sides of the upper of the flanges, $l$, which results in supporting or balancing the dead weight of the ring flier, $e$, on a cushion of air.

In the above construction of ring fliers the flier instead of revolving in a resiliently mounted stationary air bearing may be provided with air supported and air lubricated running bearing parts disposed between the stationary and high speed rotating parts in a manner described in a concurrent application for Letters Patent which I have made.

An example of a ring flier having air supported and air lubricated running bearing parts is illustrated in Figs. 6 and 6$^a$. In this example the turbine discharges into an exhaust chamber, $q$, situated on one side of the center line and indicated by dotted lines, reversal of the direction of rotation being obtained as before by rotating the whole element through an angle of 180° about the axis of the air supply pipe $d$, the part, $c$, remaining stationary. The face, 21, on which the element rotates is ground up so as to prevent leakage of the working fluid thereat. About the center of the ring flier, $e$, turbine blades, $g$, are disposed which are shielded by a flange, $s$, to prevent as far as possible any losses due to the fanning action of the blades, a sufficient number of holes however being formed in the flange, $s$, in positions adjacent to the discharge from the nozzles, $t$, so as to allow a free path for the exhaust. Running bearing parts, 1, 2, 3 and 4, are disposed at each end of the ring flier, $e$, between the parts, $h$, fixed in relation to the casing, $k$, and the ring flier, $e$, which bearing parts have supporting flanges 5, 6, 7, 8, normally resting on stepped seats on the part, $h$. Supporting flanges, $l$, are also attached to the ring flier, $e$, and are disposed above and below the nozzles, $t$. In the casing, $k$, which is constructed in two parts, ducts, $u$ and $v$, are formed which register with ducts, 23, and $x$, respectively formed in the stationary part, $c$. In the position of the element as shown the ducts, $v$, situated below the nozzles and the duct, $u$, situated above the nozzles are inoperative. The air after operating on the blades, $g$, is discharged to a chamber, 19, which is of annular form and extends both above and below the nozzles. From this chamber, 19, the greater portion of the exhaust passes to the exhaust chamber, $q$, by the passage, $z$, indicated by dotted lines lifting and supporting the upper flange, $l$, of the ring flier on its passage thereto. A small part of the exhaust is led by way of the ducts, $v$, and $x$, beneath the flanges 5, and 6, of the running bearing parts, 1, and 2, which are thereby lifted and supported, the operation of lifting the flange, 5 allowing the supporting medium to escape to the atmosphere. The running bearing parts 3 and 4 are supported by a supply of air taken from the supply pipe, $c$, through the ducts, 23, and $u$, the air after acting on and lifting the flanges 7 and 8, leaks past the lower flange, $l$, to the chamber, 19, and is discharged therefrom along with the turbine exhaust. The ducts, $u$, $v$, and $x$, should be so proportioned as to take only the necessary amount of air required for supporting purposes. On inverting the element for the purpose of reversing it will be evident that the ducts for the supply of supporting fluid which were inoperative in the original position become operative in the inverted position while the operative ducts in the original position become inoperative in the inverted position the annular nature of the chamber, 19, allowing the exhaust from the turbine to act in a similar manner to that hereinbefore described even though the nozzles are inverted. Also in the inverted position the passage, $z'$ registers with the exhaust chamber, $q$, and the passage, $z$, is closed against the face, 21.

In some cases I may allow the exhaust from the turbine to support the dead weight of the ring flier alone and support the dead weight of all the running bearing parts by pressure air, while in others I may allow the exhaust to support the upper running bearing parts by the exhaust but after it has operated on the supporting flange of the ring flier. It is of course possible to considerably vary these details and yet get the results of reversing and balancing such as I have described.

In a construction of ring flier specially suitable for insertion into the air and exhaust trunks, and in which the turbine is situated at the lower end of the flier, I prefer to effect reversing by ($b$) removing the ring flier from its casing, inverting the bladed ring and then returning the flier to its casing. Sets of opposite handed nozzles, $t$, Figs. 7 and 8 are required in this case and a blanking valve or washer, 9, having a rubber face, 10, is disposed at the entrance of the nozzles which washer is arranged to be rotated so as to cover the set of nozzles which it is desired to render inoperative.

It will be obvious that the above device is of exceedingly simple construction and one in which the fanning losses occurring in the case where opposite sets of blades are provided for each direction of rotation are eliminated.

In Figs. 9 to 13 I have illustrated examples of ring fliers to which this latter method of reversing is especially applicable and which are adapted to be removably inserted in the working fluid trunks. In Fig.

9, the ring flier, e, carries turbine blades, g, at its lower extremity, the working fluid being led to the blades from the fluid supply trunk, c, by nozzles, t, sets of which may be provided for either direction of rotation. The turbine blades, g, are retained in position by a ring, 30, which may be provided with winding hooks and which is attached to the flier, e, by means of a joint of the bayonet or other suitable type. The turbine blades g, are shielded by a ring, s, which however has a sufficient number of passages formed therein in adjacent positions to the discharge from the nozzles so as to allow a free path for the exhaust. The ring, s, incloses the turbine blades as much as possible so as to reduce the losses due to the fanning action of the blades. The casing, k, is formed in two parts as shown and has projections, 11, attached to its inner surface so as to form an annular chamber, 12, between the casing, k, and the stationary part, h. Between the stationary part, h, and the highest speed rotating part, e, which constitutes the ring flier, a running bearing part, 1, is disposed having a flange 5, which rests on a seat formed on the casing, k. The part, e, is also provided with a flange, l, which is arranged above the flange, 5. The exhaust from the turbine passes through the chamber, 12, lifts and supports the flange, 5, and is thereby introduced below the flange, l, upon which it acts in a similar manner and finally escapes to the exhaust chamber, q, by the ducts, 13, and the holes, 14. It will thus be seen that the deadweight of the rotating parts is supported on a cushion of elastic fluid. Clearance spaces, 15, are provided in the running parts and the bottom of the parts, h, and 1, as well as the shielding ring, s, are cut away as shown in Fig. 11, so as to allow a free path for the exhaust. In order to economize space as much as possible the outside of the casing is flattened at the point, 16, Fig. 9, where it adjoins the adjacent casings, the section at other points being shown at 31 in Fig. 10. Rings of elastic packing, 17, are inserted in grooves formed in the walls of the trunks, c, and q, which prevent leakage of the working fluid at these points and at the same time provide a means of support which is flexible.

In Figs. 12 and 13 a modified form of ring flier is shown having two running bearing parts, 1, 2, with their supporting flanges 5 and 6. Between the various flanges cushions, 18, of rubber or other suitable material are inserted which act as buffers and allow the flanges, 5, 6 and h, to be lifted silently and together. In other respects the arrangement is similar to that already described with reference to Fig. 9.

It will be understood that in the above examples of ring fliers the lubricating medium is air and the amount of diametral clearance between the bearing surfaces should be of the order which I have indicated in my patent applications, Serial Nos. 260,120 and 272,560, to which reference is hereby made for further details and for the precautions to be taken with respect thereto.

In the claims I have used the words "pure couple" drive to designate a drive of the type in which the unbalanced component in a radial direction with respect to the axis of rotation of the air borne rotating part is small for example, a turbine or electro drive, as it is advisable in working with air bearings to employ a drive of this type in order to prevent rupture of the air films between the bearing surfaces. In the case of turbines working with air it is not essential that the nozzles should be symmetrically disposed about the axis of rotation as long as the component in the direction above described is insufficient to rupture the air film between the bearing surfaces.

Having now particularly described and ascertained the nature of my said invention and in what manner the same is to be performed, I declare that what I claim is:—

1. In a spinning, twisting or doubling machine the combination of a rotatable member;
an air bearing member co-acting with said rotatable member; one or more intermediate rotatable members disposed between said rotatable member and said air bearing member together with means for imparting a substantially "pure couple" drive to said rotatable member, as set forth.

2. In a spinning, twisting or doubling machine, the combination of, a rotatable member; an air bearing member co-acting with said rotatable member; one or more intermediate rotatable members disposed between said rotatable member and said air bearing members together with a turbine mounted on said rotatable member, as set forth.

3. In a spinning, twisting or doubling machine, the combination of a motor carrying twisting element, an air bearing member co-acting with said motor carrying twisting element together with one or more intermediate rotatable members disposed between said twisting element and said air bearing member, as set forth.

4. In a spinning, twisting and doubling machine, the combination of a motor carrying twisting element, an air bearing member co-acting with said motor carrying twisting element, one or more intermediate rotatable members disposed between said twisting element and said air bearing member together with means for supporting certain of the said rotating members on a cushion of elastic fluid as set forth.

5. In a spinning, twisting and doubling machine, the combination of a motor carrying twisting element, an air bearing member co-acting with said motor carrying twisting element, one or more intermediate rotatable members disposed between said twisting element and said air bearing member, together with means for supporting certain of said rotating members by the exhaust from the motor of said twisting element.

6. A ring flier having a detachable and invertible motor member mounted thereon.

7. A ring flier having a detachable and invertible turbine rotor member mounted thereon.

8. A ring flier mounted concentrically with a plurality of air-lubricated bearing members.

9. In combination a ring flier and an independently mounted air-supported rotatable bearing member therefor.

10. A turbine driven twisting element for a spinning, twisting or doubling machine having in combination an invertible bladed member, one or more nozzles for each direction of rotation together with means for rendering inoperative one or more of the nozzles or sets of nozzles, as set forth.

11. A motor driven twisting element for a spinning, doubling or twisting machine having in combination, an invertible rotor member, means for supporting the deadweight of the said rotor member on a cushion of elastic fluid; together with means for adapting said supporting means corresponding to the position of said rotor member, as set forth.

12. A motor driven twisting element for a spinning, doubling or twisting machine having in combination, an invertible rotor member, an air bearing member for said rotor member, one or more rotatable members disposed between said air bearing member and said rotor member, means for supporting the deadweight of said rotor and rotatable members on a cushion of elastic fluid, together with means for adapting said supporting means so as to correspond to the position of said rotor member, as set forth.

13. A motor driven twisting element for a spinning, doubling or twisting machine having in combination, an invertible rotor member, means for supporting the deadweight of the said rotor member on a cushion of elastic fluid, together with automatic means for adapting said supporting means so as to correspond to the position of said rotor member.

14. A motor twisting element for a spinning, doubling or twisting machine having in combination, an invertible rotor member, an air bearing member for said rotor member, one or more rotatable members disposed between said air bearing member and said rotor member, means for supporting the deadweight of said rotor and rotatable members on a cushion of elastic fluid, together with automatic means for adapting said supporting means so as to correspond to the position of said rotor member, as set forth.

15. In a spinning, twisting or doubling machine, the combination of a central conduit for compressed air; a plurality of sockets formed on said conduit together with a plurality of turbine driven twisting elements rotatably mounted on said sockets.

16. In combination, a ring flier; a plurality of concentric air-lubricated bearing members therefor and means for yieldingly supporting one of said members.

17. In a spinning, twisting or doubling machine the combination of an air-borne twisting unit with means for reversing the direction of rotation of said unit said means including an invertible rotor member.

18. In a spinning, twisting or doubling machine the combination of an air-borne twisting unit with means for reversing the direction of rotation of said unit, said means including a ring flier with an invertible rotor member mounted thereon.

Dated this 3rd day of August, 1906.

In testimony whereof, I affix my signature in presence of two witnesses.

SEBASTIAN ZIANI DE FERRANTI.

Witnesses:
CHAS. N. DANIELS,
LUTHER J. PARR.